United States Patent
Shimoji et al.

(10) Patent No.: US 7,885,894 B2
(45) Date of Patent: Feb. 8, 2011

(54) CONTENT DISTRIBUTION SYSTEM AND CONTENT LICENSE MANAGEMENT METHOD

(75) Inventors: Tatsuya Shimoji, Neyagawa (JP);
Hideki Kagemoto, Nara (JP);
Yoshiharu Dewa, Shinagawa-ku (JP);
Naohisa Kitazato, Shinagawa-ku (JP);
Yasushi Katayama, Shinagawa-ku (JP)

(73) Assignee: Panasonic Corporation, Osaka (JP)

( * ) Notice: Subject to any disclaimer, the term of this patent is extended or adjusted under 35 U.S.C. 154(b) by 421 days.

(21) Appl. No.: 10/566,836

(22) PCT Filed: Nov. 26, 2004

(86) PCT No.: PCT/JP2004/017601
§ 371 (c)(1),
(2), (4) Date: Feb. 2, 2006

(87) PCT Pub. No.: WO2005/052831
PCT Pub. Date: Jun. 9, 2005

(65) Prior Publication Data
US 2006/0229990 A1    Oct. 12, 2006

(30) Foreign Application Priority Data
Nov. 27, 2003    (JP)  ............................. 2003-397863

(51) Int. Cl.
*G06F 21/00* (2006.01)
*G06F 21/22* (2006.01)
(52) U.S. Cl. ............................. 705/51; 705/57; 705/59; 705/901; 705/902; 705/904; 705/908; 705/911
(58) Field of Classification Search .................. 705/51, 705/57, 59, 901, 902, 904, 908, 911
See application file for complete search history.

(56) References Cited

U.S. PATENT DOCUMENTS
5,629,980 A *   5/1997   Stefik et al. .................... 705/54
(Continued)

FOREIGN PATENT DOCUMENTS
JP          8-263439              10/1996
(Continued)

OTHER PUBLICATIONS
"Conditional Access System Specifications for Digital Broadcasting", pp. 15-25, ARIB STD-B25 4.1 version, by Association of Radio Industries and Businesses, Jun. 5, 2003, with partial English translation.

*Primary Examiner*—Andrew J. Fischer
*Assistant Examiner*—Christopher C Johns
(74) *Attorney, Agent, or Firm*—Wenderoth, Lind & Ponack, L.L.P.

(57)    ABSTRACT

There are provided a content distribution system and a license management method for performing, in a collective manner, license management of a plurality of resources contained in contents. Each piece of content contains one upper-level resource (which is first referred to within the content), at least one lower-level resource (which can be referred directly or indirectly from the upper-level resource), one startup document and a license-corresponding document (which is an information file for performing, in a collective manner, license management of the resources contained in the content). The startup document contains at least upper-level resource reference destination information and at least one piece of license information for identifying view licenses required for viewing the resources contained in the content. In each resource, if link information for accessing other content is described, information for accessing the startup document of the other content is described.

5 Claims, 11 Drawing Sheets

U.S. PATENT DOCUMENTS

| | | |
|---|---|---|
| 5,638,443 A | 6/1997 | Stefik et al. |
| 5,892,900 A * | 4/1999 | Ginter et al. ............ 726/26 |
| 7,222,232 B2 * | 5/2007 | Venkatesan et al. ...... 713/167 |
| 7,260,557 B2 * | 8/2007 | Chavez ................. 705/59 |
| 2003/0217275 A1 * | 11/2003 | Bentley et al. .......... 713/184 |
| 2004/0143760 A1 * | 7/2004 | Alkove et al. ........... 713/201 |

FOREIGN PATENT DOCUMENTS

| | | |
|---|---|---|
| JP | 10-191302 | 7/1998 |
| JP | 2002-230209 | 8/2002 |
| JP | 2002-342518 | 11/2002 |

* cited by examiner

FIG. 4

STARTUP DOCUMENT  12a

```
<startup>
  <drminfo>drminfo.dri</drminfo>
  <start>foo.htm</start>
</startup>
```

FIG. 5

LICENSE-CORRESPONDING DOCUMENT  12b

```
<drminfo>
 <content_id>51</content_id>
 <licenses>
   <license>
     <license_id>100</license_id>
   </license>
   <license>
     <license_id>200</license_id>
     <sublicense>L200.slc</sublicense>
   </license>
   <license>
     <license_id>300</license_id>
     <sublicense>L300.slc</sublicense>
   </license>
 </licenses>
 <files>
   <file><name>foo.htm</name><key_id>452133</key_id></file>
   <file><name>bar.htm</name><key_id>452134</key_id></file>
   <file><name>gee.htm</name><key_id>452135</key_id></file>
   <file><name>images/a.gif</name><key_id>452142</key_id></file>
   <file><name>images/b.gif</name><key_id>452143</key_id></file>
   <file><name>images/c.jpg</name><key_id>452144</key_id></file>
   <file><name>movies/d.mpg</name><key_id>452163</key_id></file>
 </files>
</drminfo>
```

CONTENT DISTRIBUTION SYSTEM AND CONTENT LICENSE MANAGEMENT METHOD

TECHNICAL FIELD

The present invention relates to a content distribution system and a content license management method, and more particularly, to a content distribution system comprising a server for distributing encrypted contents and a receiving terminal for decrypting the contents distributed from the server by using view licenses, and a license management method implemented in the system.

BACKGROUND ART

As is well known, various contents such as images, music, and programs are distributed on digital broadcasting and Internet from servers of service providers offering contents to receiving terminals of users. These contents contain one or a plurality of resources (such as data files, program files, or the like), and are classified broadly into stream-type and multimedia-type contents. The stream-type contents are video and audio-based contents, containing only stream resources such as MPEG2-TS. The multimedia-type contents contain a plurality of resources such as stream resources, multimedia resources, monomedia resources referred from multimedia resources and the like. The multimedia resources are, for example, HTML generally used on Web pages, BML generally used on digital broadcasting, or the like. The monomedia resources are, for example, MPEG used for moving images; GIF, JPEG and PNG used for still images; MNG used for animation; MPEG2-AAC used for audio; and the like. In the multimedia resources, textual information to be displayed on a screen; reference, to be added to the textual information and presented, to monomedia resources; hyperlink to other multimedia resources; and the like can be described.

In general, a service provider subjects copyrighted contents to encryption so as to allow only authorized users to view the contents. When a user desires to view contents which have been encrypted, the user obtains view licenses containing decryption keys issued by the service provider through paying a charge, providing personal information, or the like, and subjects the encrypted contents to decryption (see Patent document 1).

In principle, one view license is provided for one piece of content, but sometimes a plurality of view licenses are provided thereto. For example, it is desired to vary usage rules regarding a period during which viewing is allowed, limitation on resources on which viewing is allowed, and the like. Although this can be easily achieved by providing a plurality of servers with resources encrypted by varying keys corresponding to respective usage rules, large-capacity servers are required because the same resources have to be redundantly stored. In order to avoid wasting server resources, therefore, a method called sub-license, for example, has been proposed (see non-patent document 1).

In this sub-license method, a key used for encryption of a resource is doubly encrypted further by another common key. For example, consider a case where it is desired to set two usage rules for a given resource, i.e., periods of one or two weeks. In this case, a resource encrypted by a key A and the key A encrypted by a key B are stored in a server for first one week. A resource encrypted by a key C and the key C encrypted by the key B are stored for next one week. A user who wants to view the resource for one week obtains a view license containing the key A (or the key C), and subjects the resource to decryption by using the key A (or the key C). On the other hand, a user who wants to view the resource for two weeks obtains a view license including the key B, subjects the key A to decryption by using the key B, and subjects the resource to decryption by using the key A for the first one week; and subjects the key C to decryption by using the key B, and subjects the resource to decryption by using the key C for the next one week.

Patent document 1: Japanese Laid-Open Patent Publication No. 2002-342518

Non-patent document 1: "CONDITIONAL ACCESS SYSTEM SPECIFICATIONS FOR DIGITAL BROADCASTING", p 15-25, ARIB STD-B25 4.1 version, by Association of Radio Industries and Businesses, Jun. 5, 2003

DISCLOSURE OF THE INVENTION

Problems to be Solved by the Invention

As described above, for the multimedia-type contents which are copyrighted and contains a plurality of resources, a service provider offers one or a plurality of view licenses per content, with the plurality of resources in one piece of content being a unit (scope) targeted for licensing. With the conventional method, however, there is no way of knowing, on a user's receiving terminal, a relationship between a resource and a piece of content, which is set by a service provider. Accordingly, it is unable to determine to which piece of content a resource belongs, that is, to which view license the resource corresponds, upon accessing the resource. In addition, when a plurality of varying encryption codes are used for resources in one piece of content, the conventional method has, on a user's receiving terminal, no way to easily grasp a relationship between resources and encryption codes, which is set by service providers.

Therefore, the conventional method, as in the above patent document 1, has a problem that it is necessitated to add information for identifying view licenses required for decryption (for example, license IDs and decryption keys) to all encrypted resources in a piece of content (shaded areas in FIG. 12), and to perform license matching processing between the above-mentioned information and information which a receiving terminal has, each time the receiving terminal accesses the resources. In particular, when a plurality of view licenses are provided for one piece of content as in the above non-patent document 1, it is necessitated to add respective pieces of information for identifying the plurality of view licenses to all encrypted resources in the content. This kind of license matching processing for each resource access may cause a delay of view processing on a receiving terminal.

Therefore, an object of the present invention is to provide a content distribution system and a content license management method which enable identification of a view license corresponding to a resource on a user's receiving terminal immediately at the time of accessing the resource without adding, to resources in a piece of content, any information for identifying a plurality of view licenses.

Solution to the Problems

The present invention is directed to a content distribution system which comprises a server for storing at least one contents including a plurality of resources and a receiving terminal for receiving a distribution of contents from the server, and to a license management system implemented in the content distribution system. To achieve the above object, the present invention has the following aspects.

The server comprises: a content storage section operable to store the content which contains an upper-level resource to be first referred to within the content, at least one lower-level resource that can be referred to from the upper-level resource, and a startup document providing at least a plurality of pieces of license information, corresponding to either one of reference destination information of the upper-level resource and a predetermined usage rule, for identifying a view license required for viewing all or a part of the resources contained in the content; and in which information for referring to a startup document of other content is described in link information for accessing resources of other content; and a communication processing section operable to receive a presentation request for a resource from the receiving terminal, and when the requested resource is not the startup document, to present the resource to the receiving terminal and when the requested resource is the startup document, to present the upper-level resource to the receiving terminal, and to provide the receiving terminal with the plurality of pieces of license information based on a description of the startup document.

The receiving terminal comprises: a communication processing section operable to receive the plurality of pieces of license information provided from the server; and a view processing section operable, each time a plurality of pieces of license information are provided, to set, for view processing, a plurality of view licenses identified by the plurality of pieces of license information and to execute view processing on a resource provided from the server by using the set plurality of view licenses. The receiving terminal may obtain a plurality of view licenses which are set for view processing, from the server or from a license server other than the server. And the receiving terminal may further comprise a content storage section for storing all or a part of contents that the server has stored.

Main features of the license management method of the present invention are that when a content containing a resource of which presentation is requested from the server is altered, the server provides the receiving terminal with a plurality of pieces of license information associated with a new piece of content, and that when the plurality of pieces of license information are provided from the server, the receiving terminal executes the view processing of a resource distributed from the server by using the plurality of view licenses identified by the plurality of pieces of license information until next license information is newly provided.

More specifically, the server determines whether or not a resource of which presentation is requested from the receiving terminal is a startup document, and when the resource is not the startup document, the server presents the requested resource to the receiving terminal, and when the resource is the startup document, the server presents to the receiving terminal an upper-level resource based on a description of the startup document and provides the receiving terminal with the plurality of pieces of license information. The receiving terminal receives the plurality of pieces of license information provided from the server, each time the plurality of pieces of license information are provided, sets, for view processing, the plurality of view licenses identified by the plurality of pieces of license information and executes the view processing of the resource distributed from the server by using this set plurality of view licenses.

Typically, in respective pieces of license information of a startup document, information for identifying a view license containing at least one decryption key provided for a resource in the content is described, and the receiving terminal identifies the plurality of view licenses based on the information for the identification, and performs decryption of resources by using the keys which the identified plurality of view licenses contain.

Here, in the license information of the startup document, information showing a relationship of correspondence between respective encrypted resources and keys for decrypting the encrypted resources is further described, and referring to the relationship of correspondence, the receiving terminal is preferably capable of uniquely identifying the keys for decryption of resources.

Preferably, this content license management method is provided in a form of a program in which a series of procedures are executed by the server and the receiving terminal which the content distribution system comprises. This program may be recorded on a recording medium which is computer-readable.

Effect of the Invention

As described above, according to the present invention, license information for each content (a startup document with the license information described) is previously generated on the side of the server and the license information (of the startup document) is provided to a receiving terminal only when a target content to be viewed is altered. And each time license information is provided, the receiving terminal sets newly at least one view license corresponding to the license information for decryption of resources. This processing allows the receiving terminal to easily grasp that once license information is provided, all resources to be viewed belong to the same content until next license information is newly provided. Thus, it is not required to perform license matching processing for checking, each time a resource to be viewed is altered, whether or not the resource belongs to a content containing a view license.

In addition, when license information contains information representing a relationship of correspondence between respective resources of one content and decryption keys, matching of a resource and a decryption key can easily be conducted on the side of the receiving terminal. And a service provider only specifies a reference destination of a startup document as an access destination of a content irrespective of kinds of contents, resulting in easier management of a content selection screen or the like. And because information associated with keys and resources are separated, in a case where it is needed to contain one particular resource in a plurality of contents respectively, the plurality of contents can share the one particular resource subjected to predetermined encryption and decryption keys can be described in respective startup documents. Further, decryption processing can be performed in a collective manner irrespective of kinds of resources, resulting in easier processing on the side of the receiving terminal.

BRIEF DESCRIPTION OF THE DRAWINGS

FIG. 4 is a diagram showing one example of a startup document 12a contained in a piece of content.

FIG. 5 is a diagram showing one example of a license-corresponding document 12b contained in a piece of content.

FIG. 6 is a diagram showing description rules of the startup document 12a.

Figure 1:
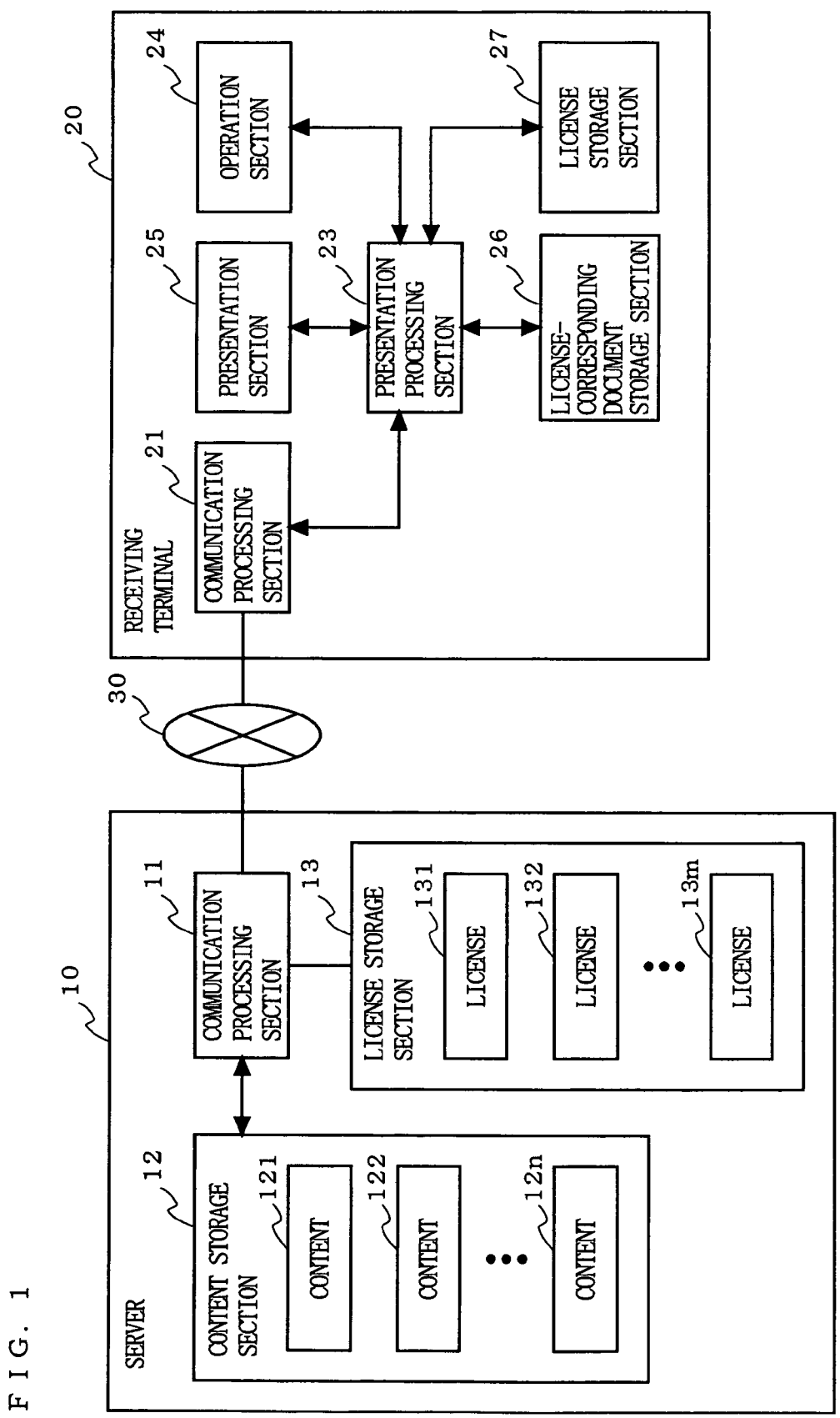
FIG. 1 is a schematic block diagram illustrating of a content distribution system according to a first embodiment of the present invention.

DESCRIPTION OF THE REFERENCE CHARACTERS 10, 40 and 50 server
11, 21, and 22 communication processing section
12 content storage section
13 license storage section
20, 60, and 70 receiving terminal
23 presentation processing section
24 operation section
25 presentation section
26 license-corresponding document storage section
27 license storage section
28 content storage section
30 communication path
121-12n, 281, and 282 contents
12a startup document
12b license-corresponding document
12c sub-licenses
12d-12f resources
131-13m licenses

BEST MODE FOR CARRYING OUT THE INVENTION

In the following embodiments, examples of a content distribution system in which encrypted contents have been stored in a server on the side of a service provider, and in order to view the encrypted contents on a receiving terminal on the side of a user, it is necessary to obtain predetermined view licenses and subject the contents to decryption will be described.

First Embodiment

FIG. 1 is a schematic block diagram illustrating a content distribution system according to a first embodiment of the present invention. As shown in FIG. 1, the content distribution system according to the first embodiment contains a server 10 on the side of a service provider and a receiving terminal 20 on the side of a user, which are interconnected via a communication path 30 such as a network. The server 10 contains a communication processing section 11, a content storage section 12, and a license storage section 13. The receiving terminal 20 includes a communication processing section 21, a presentation processing section 23, an operation section 24, a presentation section 25, a license-corresponding document storage section 26, and a license storage section 27.

First, the structure of a content distribution system according to the present embodiment will be described.

On the server 10, the communication processing section 11 is a component which realizes a function as an interface on the side of a service provider, for example, distributing contents and providing view licenses in response to a request from the receiving terminal 20. The content storage section 12 stores contents 121-12n (n is an integer greater than or equal to 1), of which structure will be described hereinafter. These contents 121-12n are stored in a state where the contents cannot be used as it is, through using methods such as encryption, and in order to use the contents, view licenses are additionally required. The license storage section 13 has stored view licenses 131-13m (m is an integer greater than or equal to 1) which make available respective contents 121-12n stored the content storage section 12. One or a plurality of view licenses corresponding to each content are provided. These view licenses are provided to the receiving terminal 20 only when a user who has the right to use the view licenses through payment of usage fees in advance or the like makes a request.

On the receiving terminal 20, the communication processing section 21 is a component which performs a browsing function such as displaying Web pages, a client application function for system control of the whole terminal pertinent to content distribution, or the like, and obtains contents, view licenses, or the like through communication with the server 10. The presentation processing section 23 makes the obtained contents usable by using view licenses and outputs the contents to the presentation section 25. The operation section 24 is an apparatus, such as a keyboard and a mouse, which receives user's operations and transmits the operations to the presentation processing section 23. The presentation section 25 is an apparatus, including, for example, a cathode-ray tube, a loudspeaker or the like, being operable to present video and audio to users, and presents video and audio based on instructions from the presentation processing section 23. The license-corresponding document storage section 26 stores a license-corresponding document contained in a content based on instructions from the presentation processing section 23. The license storage section 27 stores view licenses based on instructions from the presentation processing section 23.

Figure 2:
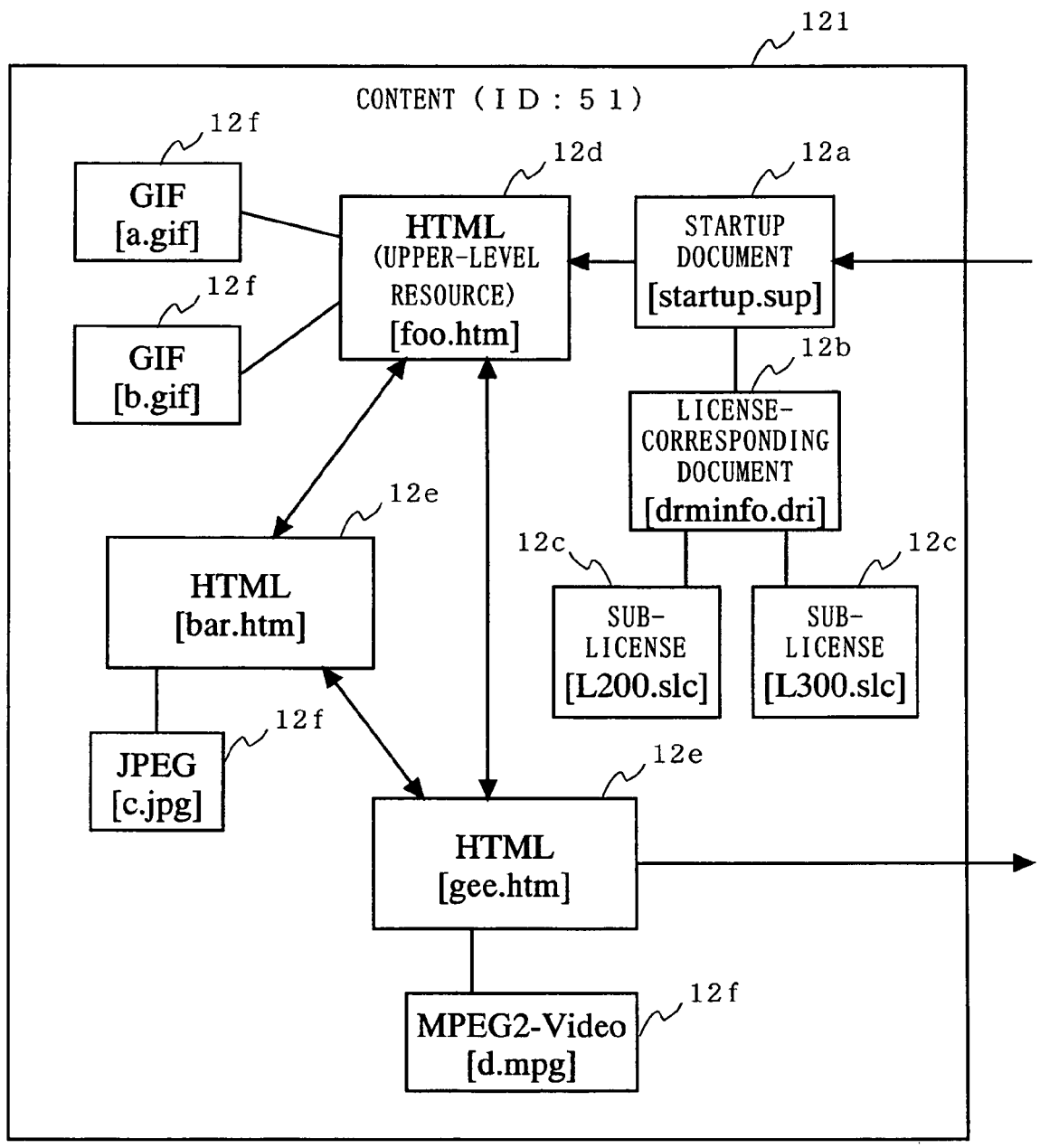
FIG. 2 is a block diagram illustrating an example of an internal structure of a content stored in a content storage section 12.

Each content 121-12n stored in the content storage section 12 contains one startup document, one license-corresponding document, and at least one resource. If a sub-license corresponding to a content is provided, the content further contains the sub-license. FIG. 2 shows one example of a piece of content 121, including a startup document 12a [startup.sup], a license-corresponding document 12b [drminfo.dri], sub-licenses 12c [L200.slc, L300.slc], and resources 12d-12f [foo.htm, bar.htm, gee.htm, a.gif, b.gif, c.jpg, d.mpg]. Respective resource names are shown in [ ]. The resources 12d-12f are classified into multimedia resources (resources 12d and 12e in the example in FIG. 2) and monomedia resources (a resource 12f in the example in FIG. 2). As is known in general, in the multimedia resources such as HTML, BML, textual information to be displayed on a screen; reference, to be added to the textual information and presented, to monomedia resources; hyperlink to other multimedia resources, and the like can be described. Among the media resources 12d-12f which the content 121 contains, the resource 12d which is first presented for, for example, performing presentation of initial information associated with contents is called an upper-level resource. Therefore, resources other than the upper-level resources are lower-level resources.

Figure 3:
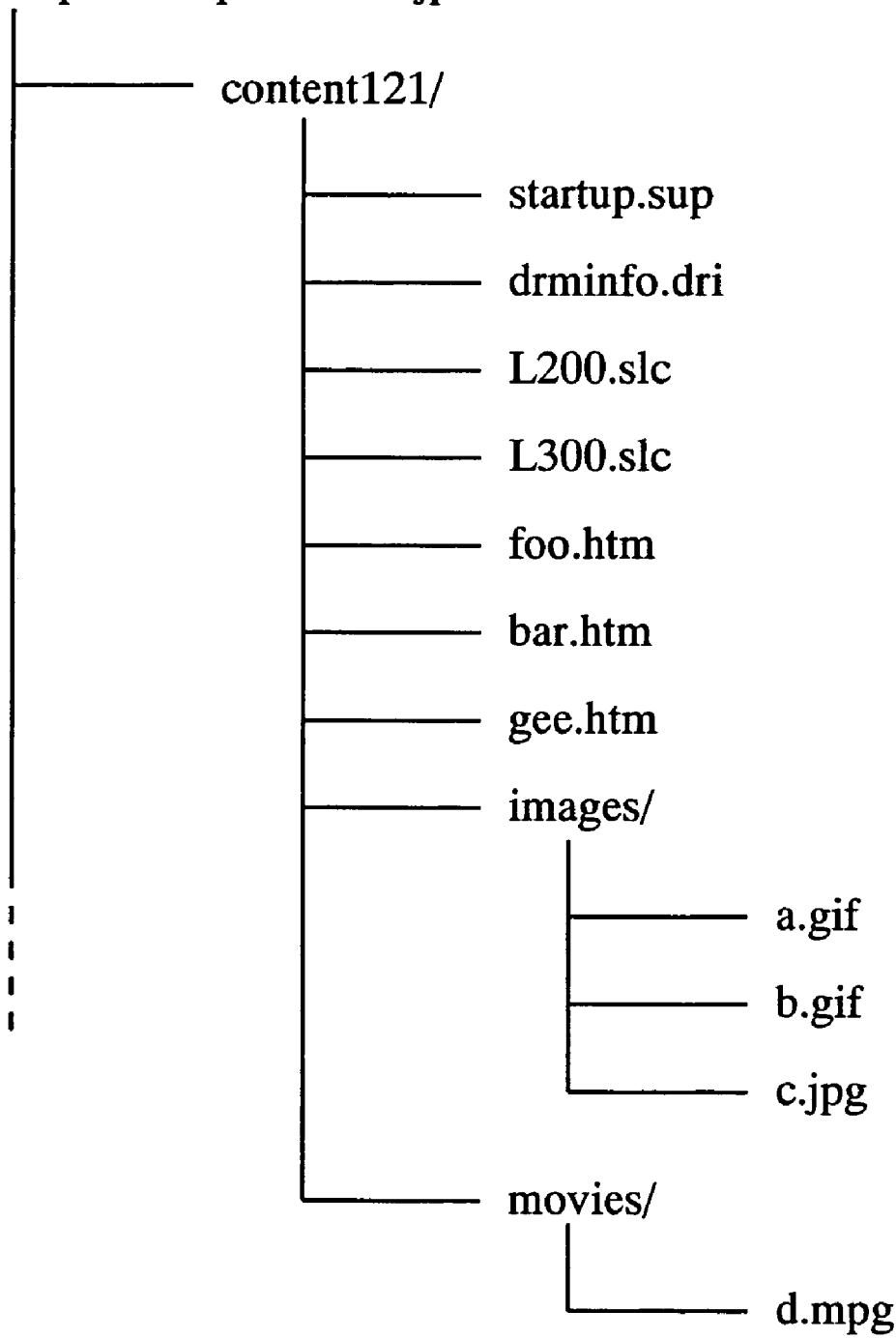
FIG. 3 is a diagram showing a logical directory structure of a content 121 shown in FIG. 2 on a server 10.

FIG. 3 is a diagram showing a logical directory structure of the content 121 shown in FIG. 2, on the server 10. It is assumed that the server 10 provides the content 121 as a WWW server and has a URL "http://sample4foo.panasonic.jp/". In this case, a monomedia resource "c.jpg" of the contents 121 is to be managed by a URL "http://sample4foo.panasonic.jp/content 121/images/c.jpg".

A startup document 12a is an information file provided for performing license management processing (DRM processing) for respective resources 12d-12f contained in the content 121, in a collective manner, where at least a resource name [foo.htm] of the upper-level resource 12d and a document name [drminfo.dri] of a license-corresponding document 12b are described as reference destination information (FIG. 4). In the license-corresponding document 12b, information for identifying a plurality of view licenses required to view respective resources 12d-12f contained in the content 121 are described (FIG. 5). This information contains a content ID for identifying a content, a plurality of pieces of license information which is information associated with view licenses for making contents usable, and resource-corresponding information for finding a correspondence between respective resources contained in a content and keys (decryption keys), required for decryption, in view licenses. In an example in FIG. 5, a string of characters in an element "content_id" corresponds to a content ID, each "license" in elements "licenses" corresponds to a piece of license information, and each "file" in elements "files" corresponds to a piece of resource-corresponding information.

This license information contains a license ID for a view license, which makes a piece of content usable, and if the view license is a license which makes a sub-license usable, further contained a resource name of the sub-license. In the example in FIG. 5, a string of characters in an element "license_id" corresponds to the license ID, and a string of characters in an element "sublicense" corresponds to a resource name of the sub-license. And resource-corresponding information contains a resource name (a string of characters in an element "name" in the example in FIG. 5) and a corresponding decryption key ID (a string of characters in an element "key_id". In the example in FIG. 5, a string of characters in an element "name" corresponds to the resource name, and a string of characters in the element "key_id" corresponds to the decryption key ID.

FIG. 4 and 5 show examples in which the startup document 12a and the license-corresponding document 12b are described respectively in an XML format, but if pieces of information equivalent to these are described, other document formats may be applicable. In addition, in the above first embodiment, the startup document 12a and the license-corresponding document 12b are contained as separate resources in the content 121, and the license-corresponding document 12b is to be referred to from the startup document 12a, but the resources of the license-corresponding document 12b may be contained in the startup document 12a and described together therein.

Each sub-license 12c contains information, respectively, which makes usable resources other than the sub-licenses in the content 121. The sub-license 12c is data in which files, having resources encrypted by a key and the key further encrypted by a common key, are managed together. Meanwhile, if a startup document is provided in a content which requires no encryption, it is enough to describe only a resource name of the upper resource 12d in the startup document 12a.

Figure 6:
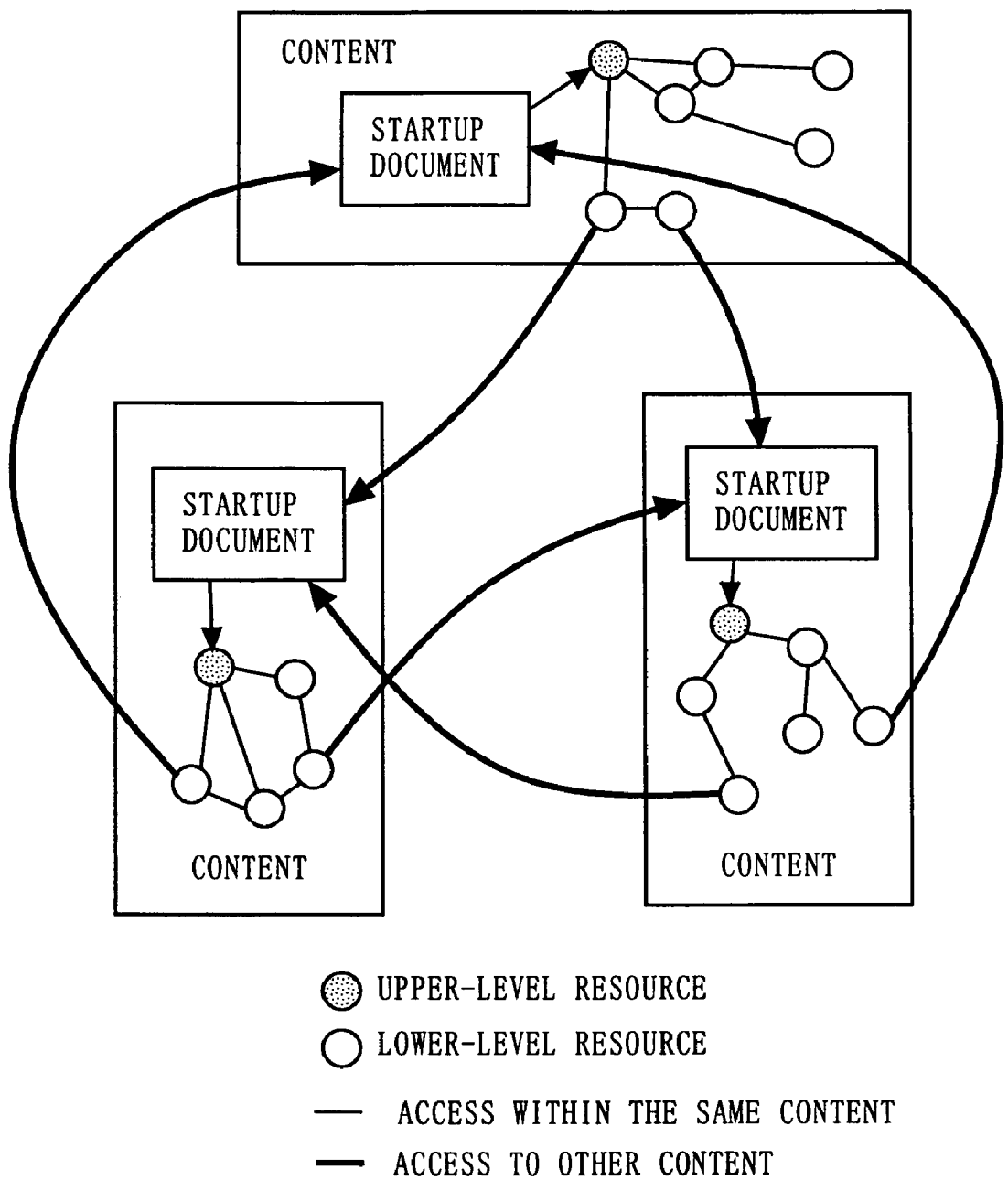

In addition, if link information for accessing other contents is described in respective resources, information for referring to the startup document, not information for directly accessing upper-level resources of other contents, is described. This description rule allows a startup document of a content to be referred to only when a view target shifts from one content to another (FIG. 6) and determines shifting status of contents to be viewed.

For each encrypted content, one or a plurality of view licenses corresponding to predetermined usages rules have been previously provided, and are uniquely identified by using respective license IDs of license information. The usage rules are conditions regarding view periods such as one week and one month, and conditions regarding view limitation for allowing only specified resources to be viewed.

Figure 7:
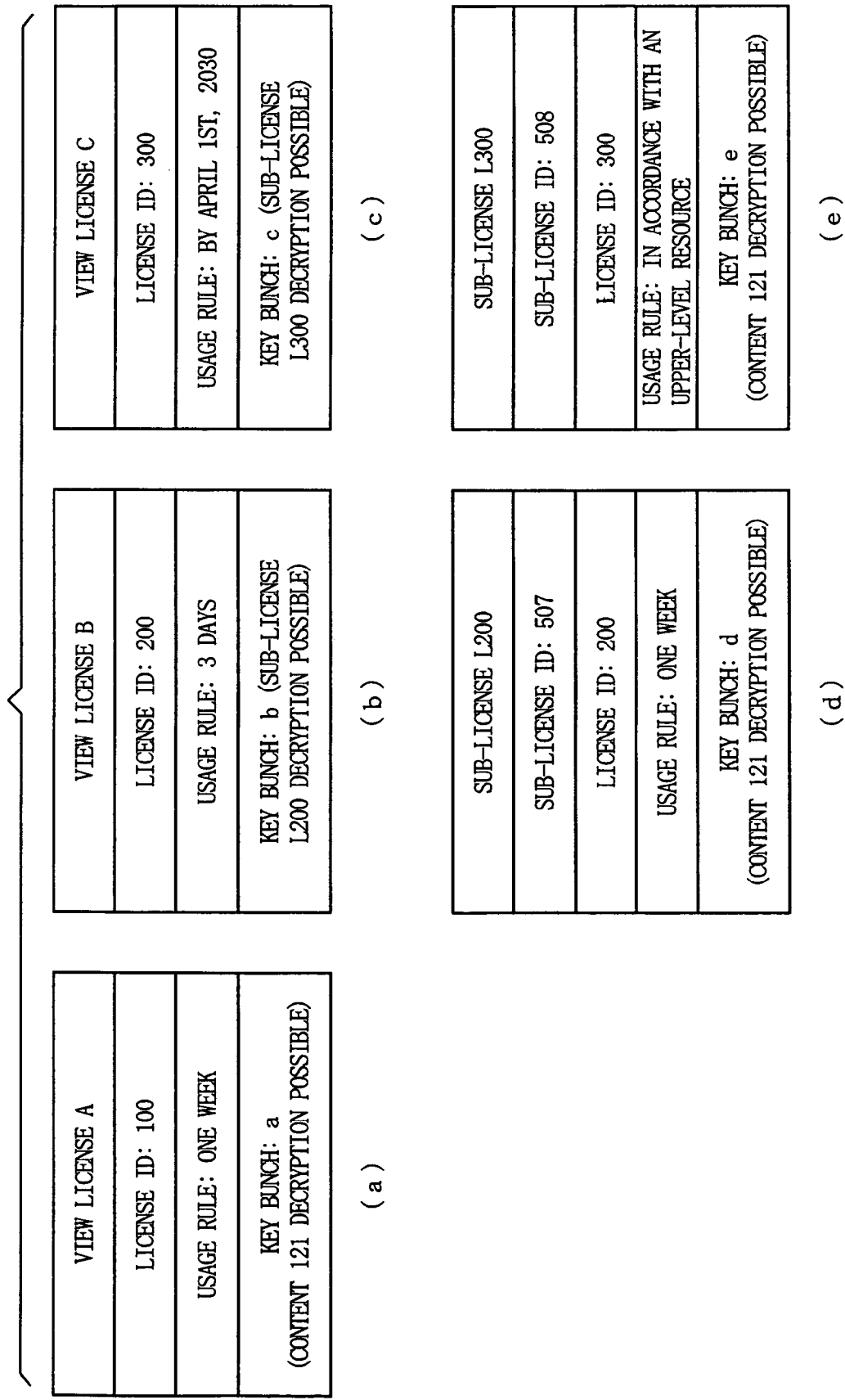
FIG. 7 is a diagram showing examples of view licenses stored in a license storage section 13.

View licenses 131-13m stored in a license storage section 13 contain license IDs, usage rules, and key bunches, as exemplified in (a) to (c) of FIG. 7. The license ID is unique information for identifying the view licenses themselves. The usage rules are conditions regarding periods, the numbers of times or the like in a case where contents are made usable by using the view licenses (including a case in which making sub-licenses usable allows indirectly contents to be made usable). The key bunch is a collection of a plurality of decryption keys to actually make contents or sub-licenses usable (that is, to decode encrypted contents or sub-licenses here).

In addition, sub-licenses 12c stored in the content storage section 12 contain sub-license IDs, license IDs, usage rules, and key bunches, as exemplified in (d) and (e) of FIG. 7. The sub-license IDs are unique information to identify the sub-licenses themselves. The license IDs are unique information to identify the view licenses required for making the sub-licenses usable. The usage rules are conditions regarding periods, the numbers of times or the like in a case where contents are made usable by using the sub-licenses. There are the cases where usage rules unique to sub-licenses are specified and where usage rules are in accordance with corresponding view licenses. The key bunch is a collection of a plurality of decryption keys to actually make contents usable.

Figure 8:
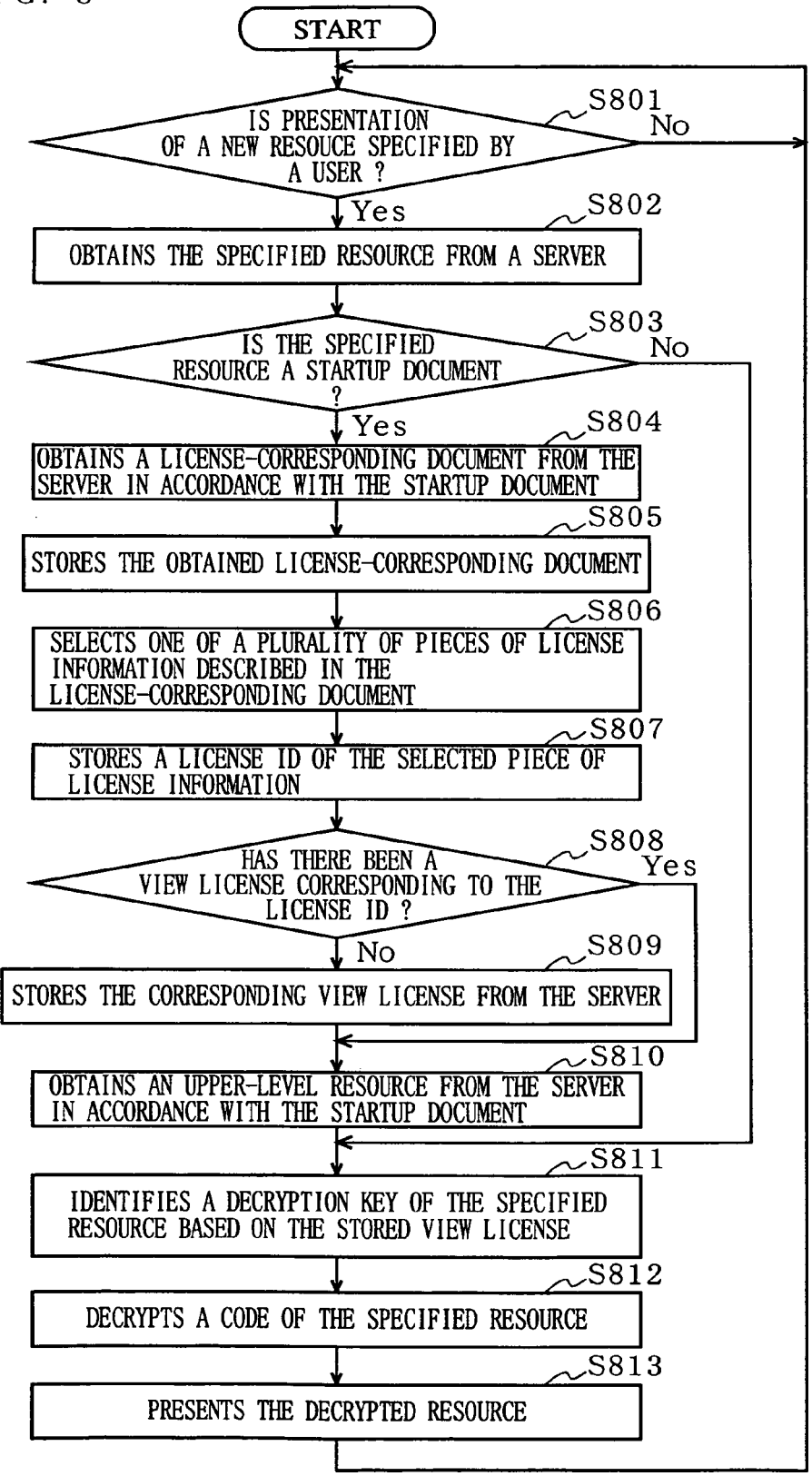
FIG. 8 is a flowchart showing procedures of a license management method according to the first embodiment of the present invention.

Next, referring to FIG. 8, a license management method for viewing contents, which is implemented in content distribution system having the above described structure, according to the first embodiment, will be described. FIG. 8 is a flowchart showing procedures of the license management method performed by the receiving terminal 20.

When presentation of a new resource is specified by a user via an operation section 24 (including a case where a first resource is presented in a status with no presentation) (step S801), the receiving terminal 20 obtains the specified new resource from the server 10 (step S802). The receiving terminal 20 determines whether or not the obtained new resource is a startup document (step S803). This determination can be performed by checking a resource name, resource information, or the like. For example, it is identified by header information (content-type header of HTTP or the like) transmitted together with a resource from the server 10 when the resource is obtained from the server 10. When the new resource is not a startup document (No at step S803), the receiving terminal 20 proceeds to step S811 at which a decryption key for the new resource specified by a user is identified.

When the new resource is a startup document (Yes at step S803), the receiving terminal 20 obtains a license-corresponding document from the server 10 in accordance with a description of a startup document (reference destination information) (step S804). And the receiving terminal 20 stores the obtained license-corresponding document in a license-corresponding document storage section 26 (step S805). Next, the receiving terminal 20 selects one piece of license information from a plurality of pieces of license information described in the stored license-corresponding document (step S806). As for a method for this selection, a description will be given hereinafter. And the receiving terminal 20 stores in the license-corresponding document storage section 26 a license ID described in the selected one piece of license information (step S807). After the license ID has been stored, the receiving terminal 20 determines whether or not a view license corresponding to the license ID is held, i.e., whether or not the view license corresponding to the license ID has already been stored in a license storage section 27 (step S808). If not already stored, the receiving terminal 20 obtains from the server 10 the corresponding view license, stores the corresponding view license in the license storage section 27, and sets, for content view processing, the corresponding view license (step S809). After the view license has been set, the receiving terminal 20 obtains from the server 10 an upper-level resource in accordance with the description of the startup document (reference destination information) (step S810).

And based on the set view license, the receiving terminal 20 identifies a decryption key used for decoding the new resource obtained at step S802 or the upper-level resource obtained at step S810 (step S811). After the decryption key has been identified, the receiving terminal 20 performs decryption on the resource by using the decryption key (step S812). The decrypted resource is screen-displayed on the presentation section 25. (step S813).

If a sub-license corresponding to a view license is provided at step S812, however, after the sub-license has been subjected to decryption by using a decryption key contained in the view license, the obtained resource is subjected to decryption by using any decryption key contained in the sub-license. Alternatively, without decryption processing of an encrypted sub-license each time a coded resource is subjected to decryption at step S812, the decryption processing of the encrypted sub-license may be previously performed when the view license is obtained, stored and set at step S809, and the decrypted sub-license may be used at step S812.

Specifically, referring to the above examples in FIG. 2 to 5, license management enabled by this processing will be described as follows.

First, suppose that the receiving terminal 20 has already been presenting some content other than the content 121 and is waiting an instruction for presentation of a new resource at step S801. Also suppose that in the content being presented, an anchor element <a_href="http://sample4foo.panasonic.jp/content121/startup.su p"> has been described. When a user performs an operation to execute a hyperlink in this anchor element (for example, clicking a screen-displayed part corresponding to the anchor element), an instruction to present a new resource "startup.sup" is generated.

The generation of the instruction to present the new resource allows processing to proceed from step S801 to step S802. At step S802, the specified resource "startup.sup" is obtained. At step S803, since the specified resource is a startup document 12a, the processing proceeds to step S804. At step S804, based on a character string "drminfo.dri" in an element "drminfo" of the startup document 12a, a license-corresponding document 12b is obtained from the content server 10. At step S805, a license-corresponding document of the previous content stored in the license-corresponding document storage section 26 is first erased, and the license-corresponding document 12b obtained at step S804 is stored in the license-corresponding document storage section 26.

At step S806, a plurality of pieces of license information (license elements) in the license-corresponding document 12b are read out and one license to be used is selected. As exemplified hereinafter, there exist a plurality of selection methods. In this example, a view license B is selected by using any one of the methods. At step S807, a license ID: 200 of the selected view license B is stored in the license-corresponding document storage section 26. At step S808, it is checked whether or not the selected view license B is stored in a license storage section 27. Since the selected license B is not stored here, at step S809, the view license B of a license ID: 200 is requested to a license server and obtained. At step S810, based on a character string "foo.htm" in a start element of the startup document 12a, the upper-level resource 12d is obtained from the content server 10.

At step S811, based on the license ID: 200 stored in the license-corresponding document storage section 26, the view license B in the license storage section 27 is identified. And in resource-corresponding information in the license-corresponding document 12b stored in the license-corresponding document storage section 26, an element of which a resource name (a character string in an element "name") is a name of the resource currently being specified is searched, and "452133" is obtained as a corresponding key ID (a character string in an element "key_id"). At step S812, by using the key ID "452133" contained in the view license B identified at step S811, the upper-level resource 12d (foo.htm)is decoded. At step S813, the decoded upper-level resource is presented. And processing returns from step S813 to step S801.

Because the upper-level resource 12d has referred to a resource 12f of a.gif, i.e., presentation of the resource 12f of a.gif is instructed, processing proceeds to step S802 and the resource 12f of a.gif is obtained. Next, at step S803, it is determined that the resource 12f is not a startup document. Then, at step S811, a key ID "452142" corresponding to a.gif, which is in the license-corresponding document 12b, is identified. Next, at step S812 and step S813, a resource 12f of a.gif is decoded by using the identified key and presented. And processing returns from step S813 to step S801 and processing for a resource 12f of b.gif is also performed in the same manner as described above.

Further, the upper-level resource 12d contains a hyperlink to other resource 12e (bar.htm), and here, suppose that a user performs herein an operation to execute the hyperlink (for example, clicking a corresponding element on a screen), since presentation of a new resource 12d is instructed, this resource is obtained at step S802. Next, at step S803, it is determined that the resource 12e is not a startup document. Then, at step S811, a key ID "452134" corresponding to bar.htm, which is in the license-corresponding document 12b, is identified. Next, at step S812 and S813, a resource of bar.gif is decoded by using the identified key and presented. And processing returns from step S813 to step S801 and processing for a resource 12f of c.jpg is also performed in the same manner as described above.

Methods for selecting one piece of license information from a plurality of pieces of license information at step S806 will be described.

(1) Manual Selection by a User

In a first method, license IDs and usage rules corresponding to a plurality of pieces of license information in a license-corresponding document are respectively displayed on a screen of the presentation section 25 and are open to selection by a user. In the case of this method, since usage rules are not contained in the license information itself in the above-mentioned examples of the embodiment, it is necessary to inquire as a key a license ID of the server 10. A precondition in this case is that the server 10 has a function of responding to such an inquiry.

(2) Automatic Selection Based on Purchase Information

In general, the information regarding what view license has been purchased by a user is managed on the server 10. Therefore, a license can be selected by using this management information as described hereinafter. First, the receiving terminal 20 inquires the server 10 what view license has been purchased by a user, by using a user ID as a key. Of course, a precondition in this case is also that the server 10 has a function of responding to such an inquiry. And based on a response from the server 10, the view license which has been purchased is automatically selected from a plurality of pieces of license information. In a case where information regarding what view license has been purchased by a user is managed on the side of receiving terminal 20, however, it is not necessary to inquire the server 10. And if there are a plurality of view licenses which can be automatically selected, a combination of this method and other method such as selection by a user may be used.

(3) Automatic Selection Based on Priority

Based on usage rules and usage track records of view licenses, which correspond to a plurality of pieces of license information in a license-corresponding document, a view license to be used is automatically selected. The usage rules include, in general, the following types: absolute allowable usage periods (usable for any number of times until date X), relative allowable usage periods (usable from the first time of use until X days later), allowable total time of use (usable for X days in total), and an allowable number of times of use (usable for X times) or the like. The usage track record refers to what extent a view license has actually been used to. For example, in a case where a usage rule is the allowable total time of use, the usage track record is information regarding a time period for which a view license has actually been used so far. In a case where a usage rule is an allowable number of times of use, the usage track record is information regarding the number of times a view license actually has been used so far. The usage track records are managed on the receiving terminal 20 in general.

On the above basis, a view license can be automatically selected, for example, based on priority described hereinafter. View license whose usage rule is the absolute allowable usage period is used with higher priority than view licenses whose usage rules are the allowable total time of use and the allowable number of times of use. This is because a view license whose usage rules are absolute allowable usage periods can be used without limitation within an allowable period. Between both whose usage rules are the allowable total time of use, a view license which has less remaining time of use (given by subtracting the time period during which a view license has been used so far, from the allowable total time of use) are used with higher priority. And between both whose usage rules are the allowable numbers of times of use, a view license which has a number of fewer remaining times of use (given by subtracting the number of times at which a view license has been used so far, from allowable number of times) is used with higher priority. This is to reduce the number of view licenses, which the receiving terminal 20 has to manage, to as small as possible, which the receiving terminal 20 has to manage, by using view licenses having numbers of fewer remaining times of use, with higher priority given.

As described above, in the content distribution system and the license management method according to the first embodiment of the present invention, a startup document and a license-corresponding document are previously generated for each content on the side of a server, and license information in a license-corresponding document is provided to the side of a receiving terminal only when a content to be presented is altered. And each time license information is provided, the side of the receiving terminal uses a view license corresponding to a license ID of the license information for decryption of resources. In addition, this processing enables the receiving terminal to easily grasp that once license information is provided, all resources presented belong to the same content until the next license information is newly provided. Thus, it is not required to perform license matching processing for checking whether or not a resource belongs to a content having a view license each time a resource to be viewed is altered.

In the present invention, since a license-corresponding document contains information representing the relationship of correspondence between respective resources of one content and decryption keys, correspondence between a resource and a decryption key can easily be arranged on the side of the receiving terminal.

In addition, a service provider can specify a reference destination of a startup document as an access destination of a content irrespective of kinds of contents, resulting in easier management of a content selection screen or the like.

And because pieces of information associated with keys and resources are separated, in a case where it is needed to contain a given resource in a structure of a plurality of contents respectively, the plurality of contents share the given resource subjected to predetermined encryption and decryption keys can be described in respective startup documents.

Further, decryption processing can be performed in a collective manner irrespective of kinds of resources, resulting in easier processing on the side of the receiving terminal.

Although in the above first embodiment, the case where a plurality of resources contained in one content are stored in the same server is described, these resources may be stored separately in a plurality of servers. And although the case where startup documents are also stored together with a plurality of resources in the same server is described, these startup documents may be separated from the resources and stored collectively in a different server.

Further, in the above first embodiment, a method for accessing startup documents of each content through a menu screen of Web pages (home pages of Internet shops or the like) or the like displayed with browsing functions is described. In addition to this accessing method, other accessing method using metadata in which access destinations of contents (URL) or the like are described is also considered. In this method, desired metadata is downloaded from a database in which metadata is stored, by using a predetermined application other than a browser, and startup documents of contents are accessed directly through a menu screen generated from this metadata.

Second Embodiment

Figure 9:
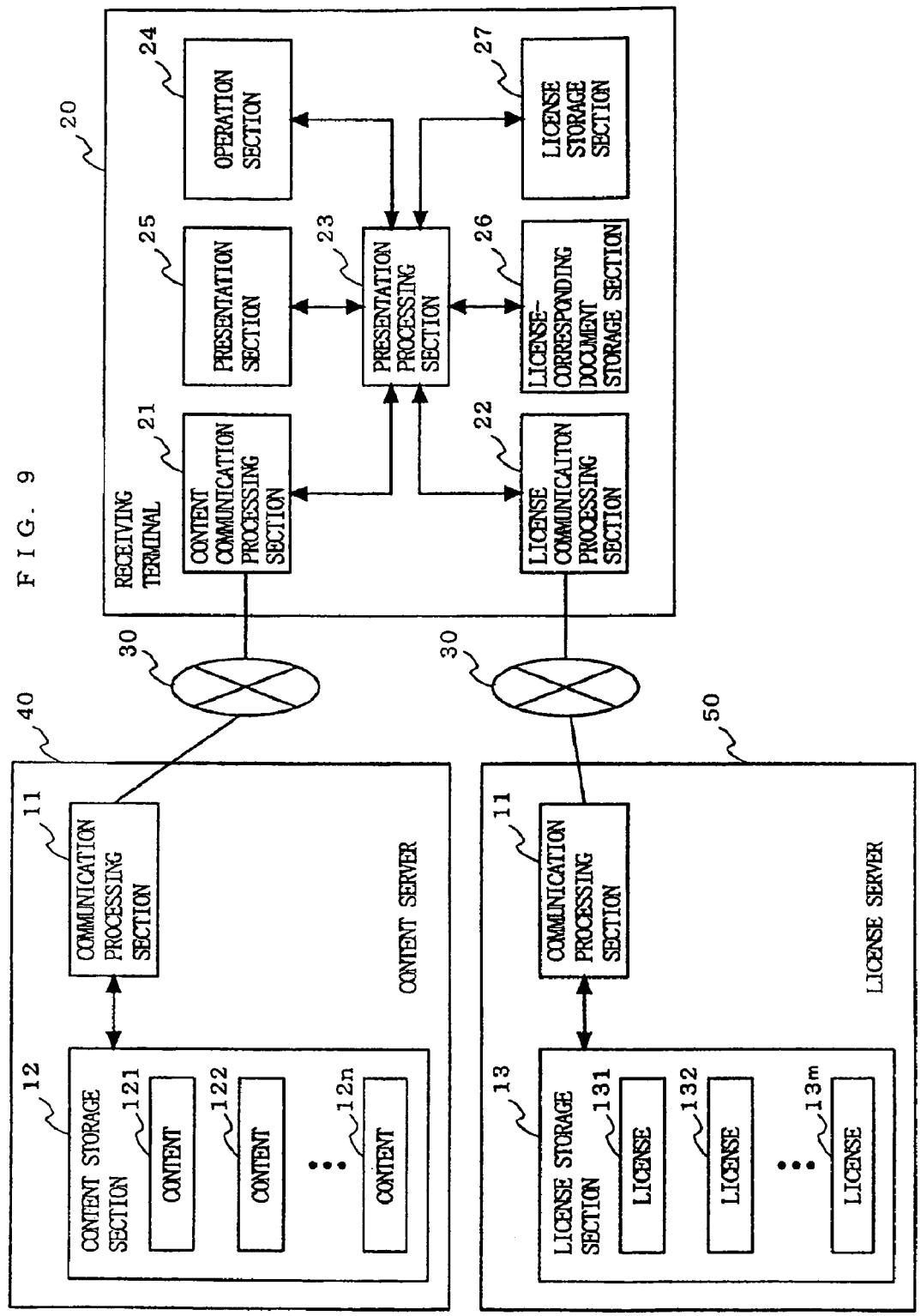
FIG. 9 is a schematic block diagram illustrating a content distribution system according to a second embodiment of the present invention.

FIG. 9 is a schematic block diagram illustrating a content distribution system according to a second embodiment of the present invention. In FIG. 9, the content distribution system according to the second embodiment of the present invention comprises a content server 40 and a license server 50 on the side of a service provider, and a receiving terminal 60 on the side of a user, which are interconnected via communication path 30 such as network or the like. The content server 40 comprises a communication processing section 11 and a content storage section 12. The license server 50 comprises a communication processing section 11 and a license storage section 13. The receiving terminal 60 comprises a content communication processing section 21, a license communication processing section 22, a presentation processing section 23, an operation section 24, a presentation section 25, a license-corresponding document storage section 26, and a license storage section 27.

As shown in FIG. 9, the content distribution system according to the second embodiment is different from that according to the first embodiment in that a server 10 is divided into the content server 40 and the license server 50; that a communication processing section of a receiving terminal 20 is divided into the content communication processing section 21 and the license communication processing section 22; and that through this structure, content distribution and view license management are separately performed. With a focus on the differences, the content distribution system according to the second embodiment will be described hereinafter.

The communication processing section 11 in the content server 40 performs content distribution or the like in response to a request from the receiving terminal 60. The communication processing section 11 in the license server 50 provides view licenses or the like in response to a request from the receiving terminal 60. The content communication processing section 21 in the receiving terminal 60 communicates with the content server 40 and obtains contents. The license communication processing section 22 in the receiving terminal 60 communicates with the license server 50 and obtains view licenses.

Figure 10:
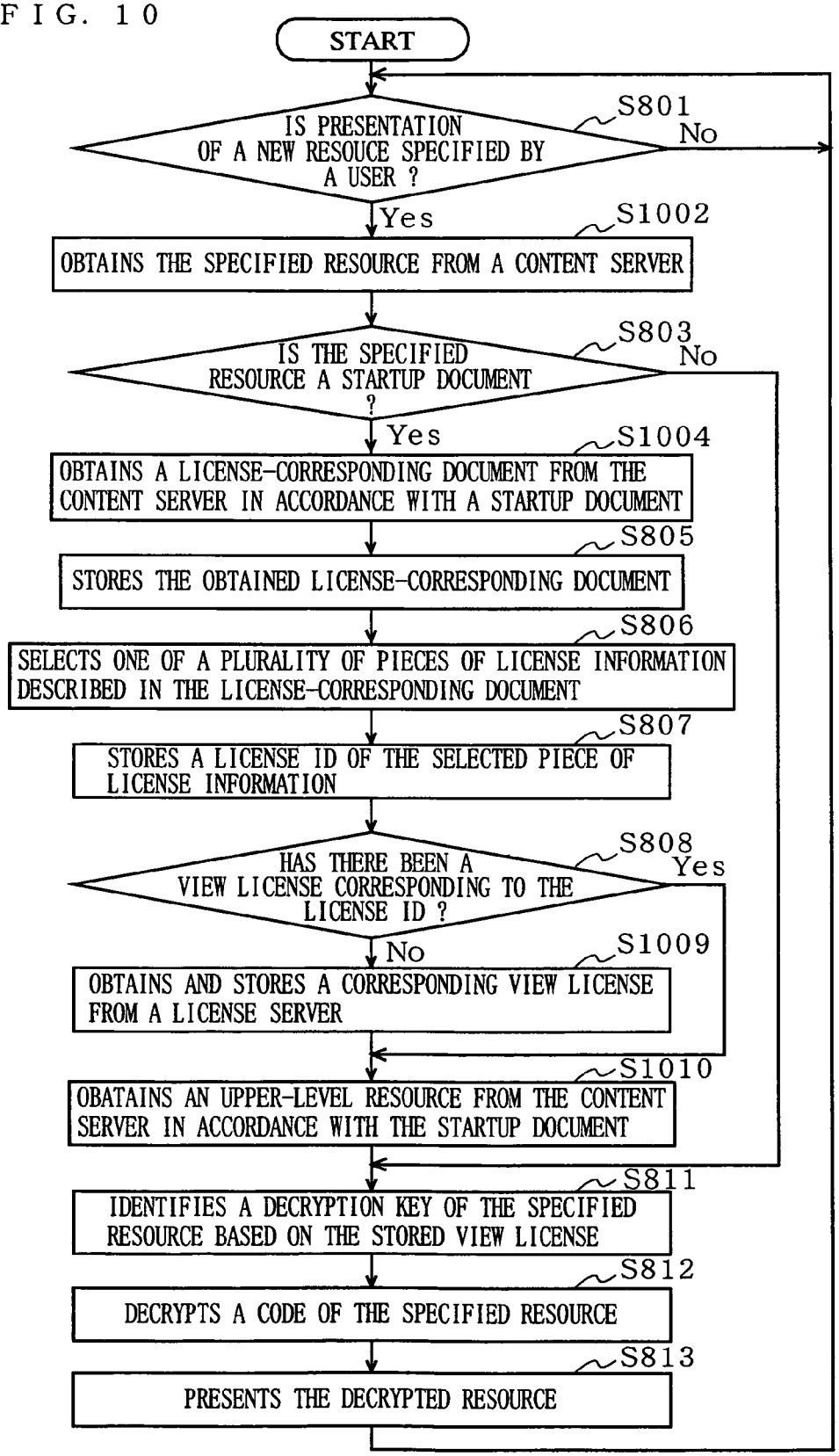
FIG. 10 is a flowchart showing procedures of a license management method according to the second embodiment of the present invention.

FIG. 10 is a flowchart showing procedures of the method of license management performed by the receiving terminal 60. When presentation of a new resource is requested by a user via the operation section 24 (step S801), the receiving terminal 60 obtains the specified new resource from the content server 40 (step S1002). The receiving terminal 60 determines whether or not the obtained new resource is a startup document (step S803). When the new resource is not a startup document (step S803, No), the receiving terminal 60 proceeds to step S811 at which a decryption key for the new resource specified by a user is identified.

When the new resource is a startup document (step S803, Yes), the receiving terminal 60 obtains a license-corresponding document from the content server 40 in accordance with a description of the startup document (reference destination information) (step S1004). The receiving terminal 60 stores the obtained license-corresponding document in the license-corresponding document storage section 26 (step S805). Next, the receiving terminal 60 selects one piece of license information from a plurality of pieces of license information described in the stored license-corresponding document (step S806). The receiving terminal 60 stores a license ID described in the selected one piece of license information into the license-corresponding document storage section 26 (step S807). After the license ID has been stored, the receiving terminal 60 determines whether or not a view license corresponding to the license ID is held, i.e., whether or not the view license has already been stored in the license storage section 27 (step S808). If not already stored, the receiving terminal 60 obtains the corresponding view license from the license server 50, stores in the license storage section 27, and sets the corresponding view license for content view processing (step S1009). After the view license has been set, the receiving terminal 60 obtains an upper-level resource in accordance with a description of the startup document (reference destination information) from the content server 40 (step S1010).

And based on the view license set for content view processing, the receiving terminal 60 identifies a decryption key to decode the new resource obtained at step S1002 or the upper-level resource obtained at step S1010 (step S811). After the decryption key has been identified, the receiving terminal 60 performs decryption of the resource by using this decryption key (step S812). This decrypted resource is screen-displayed on the presentation section 25 (step S813).

As described above, also in the content distribution system and the license management method according to the second embodiment of the present invention, the receiving terminal can easily grasp that once license information is provided, all resources presented belong to the same content until the next license information is newly provided. Thus, it is not required to perform license matching processing for checking whether or not a resource belongs to a content having a view license each time a resource to be viewed is altered.

Third Embodiment

Figure 11:
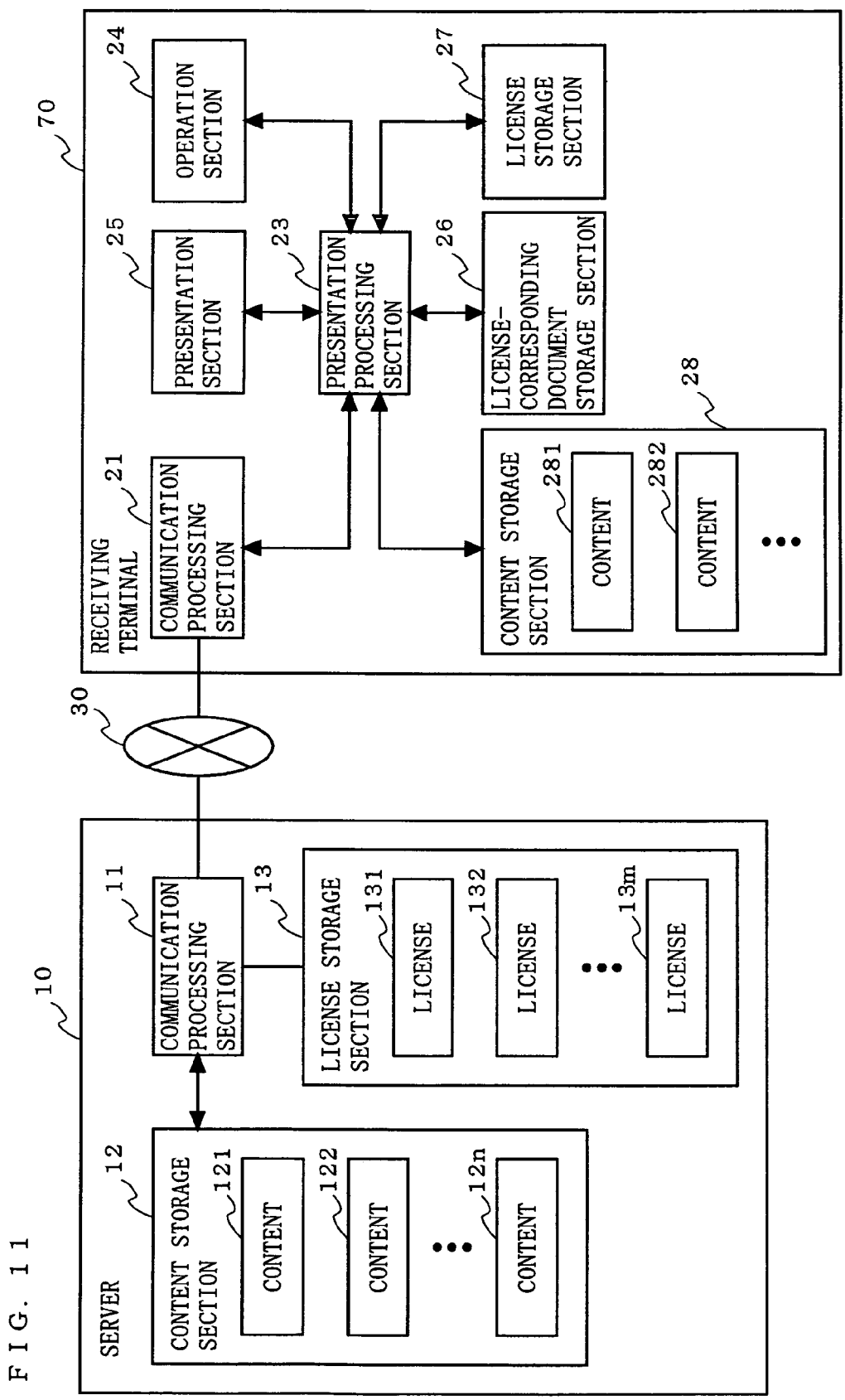
FIG. 11 is a schematic block diagram illustrating a structure of a content distribution system according to a third embodiment of the present invention.
Figure 12:
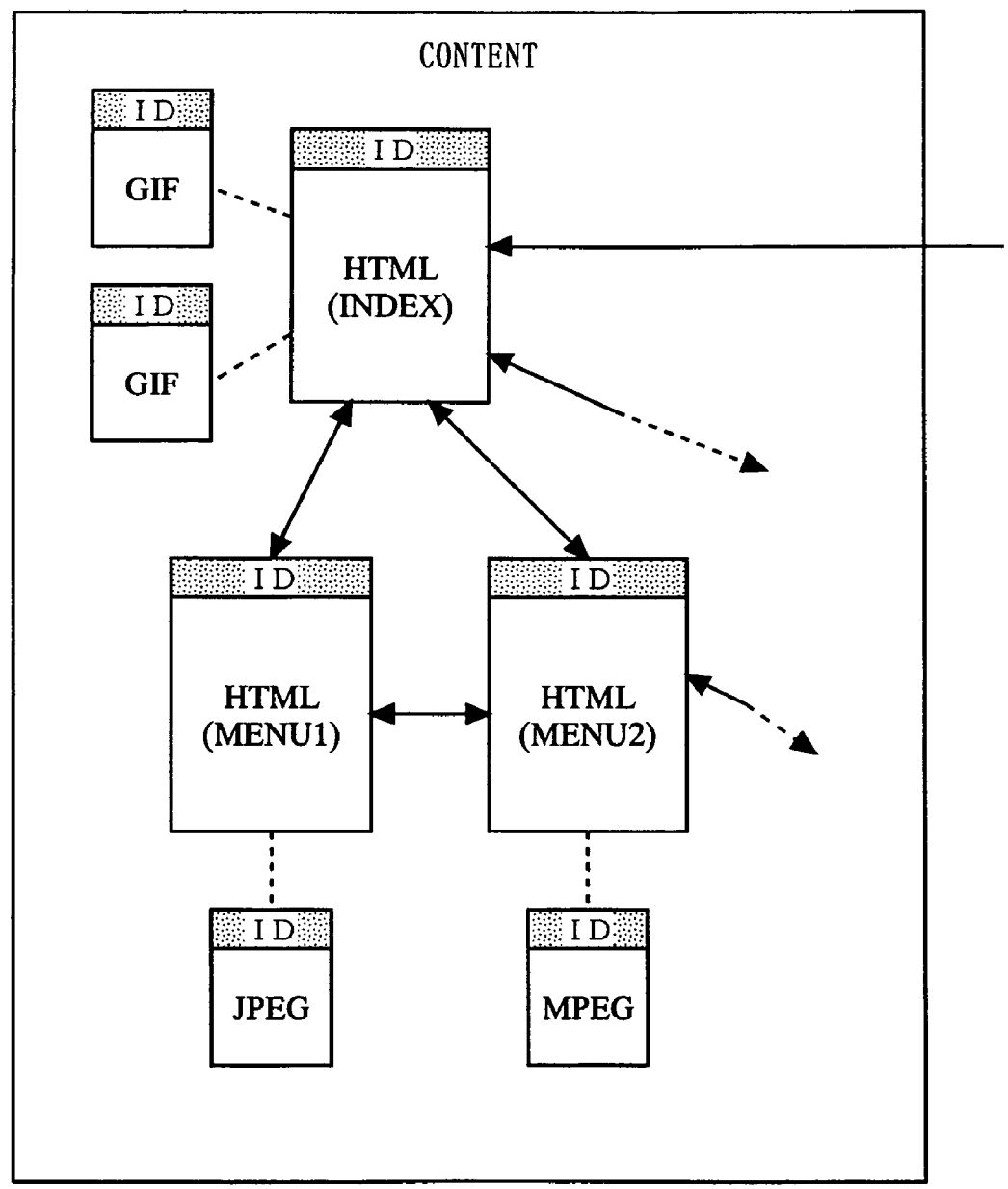
FIG. 12 is a block diagram illustrating an example of an internal structure of a conventional content.

FIG. 11 is a schematic block diagram illustrating a content distribution system according to a third embodiment of the present invention. In FIG. 11, the content distribution system according to the third embodiment comprises a server 10 on the side of a service provider and a receiving terminal 70 on the side of a user, which are interconnected via a communication path 30 such as network or the like. The server 10 comprises a communication processing section 11, a content storage section 12, and a license storage section 13. The receiving terminal 70 comprises a communication processing section 21, a presentation processing section 23, an operation section 24, a presentation section 25, a license-corresponding document storage section 26, a license storage section 27 and a content storage section 28.

As shown in FIG.11, the content distribution system according to the third embodiment is different from that according to the first embodiment in that the content storage section 28 is further added to the receiving terminal 20 of the first embodiment. With a focus on the difference, the content distribution system according to the third embodiment will be described.

In the content storage section 28, before a presentation request of a content is made, contents 281, 282, . . . obtained by previous downloading or the like from the server 10 are stored. Therefore, in this license management method, the receiving terminal 70 do not obtain resources from the server 10, unlike at step S802 and step S810 shown in FIG. 8.

As described above, also in the content distribution system and the license management method according to the third embodiment, the receiving terminal can easily grasp that once license information is provided, all resources presented belong to the same content until the next license information is newly provided. Thus, it is not required to perform license matching processing for checking whether or not a resource belongs to a content having a view license each time a resource to be viewed is altered.

As is seen in the content distribution system shown in FIG. 11, it is not particularly important in the present invention where contents are arranged. In other words, if a method in which a user specifies a resource contained in a piece of content and a description method for specifying the resource from other resource have been decided and there is a structure where a receiving terminal can obtain the resource based on the specifying, the present invention is applicable, wherever resources are arranged. In the system structure shown in FIG.

3, for example, a method for specifying a resource is a method using URL such as http://sample4foo.panasonic.jp/content5531/images/c.jpg and a method in which a receiving terminal obtains a resource is a method using HTTP. And in the system structure shown in FIG. 11, a method for specifying a resource is the method using URL such as "file:// . . . " used in general, and a method in which the receiving terminal obtains a resource is to access a hard disk or the like in a very general manner.

Accordingly, resources contained in a content may be arranged in a plurality of content servers in a dispersed manner and only a part of the resources may be previously obtained in an apparatus such as a hard disk device. Here, the present invention does not particularly focus on a method for previously obtaining resources contained in a piece of content into an apparatus such as a hard disk device and any methods may be employed. There are methods known in general: resources may be obtained from a Web server through communication by using HTTP; resources may be obtained from broadcasting signals through reception of digital broadcasting; and recording media such as DVD or the like may be used.

INDUSTRIAL APPLICABILITY

The present invention is applicable to a content distribution system in which encrypted contents are subjected to decryption by using predetermined view licenses and in particular, is well-suited, for example, to a case where license management of a plurality of resources contained in a content is performed for each content in a collective manner.

The invention claimed is:

1. A content distribution system comprising a server that stores a content containing a plurality of resources and comprising a receiving terminal that receives the content distributed from the server,
   wherein the content includes:
      an upper-level resource that is first referred to by a startup document, the upper-level resource being from among the plurality of resources contained in the content, such that the upper-level resource is the first of the plurality of resources referred to by the startup document;
      at least one lower-level resource to be referred to from the upper-level resource; and
      the startup document including (i) reference destination information of the upper-level resource, (ii) content identification information identifying the content, (iii) a plurality of pieces of license information about view licenses for making the content usable, (iv) resource-corresponding information causing the plurality of resources contained in the content to correspond to one or more decryption keys included in the view licenses and required for decryption, and (v) sub-licenses when the content corresponds to the sub-licenses, such that:
         each of the sub-licenses manages one or more respective keys, the one or more respective keys managed by each sub-license having encrypted one of the plurality of resources;
         each of the sub-licenses has data obtained by encrypting the one or more respective keys by a common key;
         the content corresponds to the content identification information identifying the content;
         each of the plurality of pieces of license information includes (i) license identification information that is unique information identifying a corresponding view license of the view licenses, and (ii) when the corresponding view license makes a corresponding sub-license of the sub-licenses usable, resource identification information of the corresponding sub-license;
      each of the view licenses is stored in the server and each respective view license of the view licenses includes (i) the license identification information that is unique information identifying the respective view license, (ii) a usage rule representing a condition regarding a view period and a condition regarding a view limitation, and (iii) a key bunch of decryption keys for decoding one of the content, when encrypted, and the corresponding sub-license, when encrypted;
      the resource-corresponding information includes, for each of the plurality of the pieces of license information, a name of the resource identification information of the corresponding sub-license and identification information of a corresponding decryption key of the decryption keys included in the view licenses;
      at least one of the resources contained in the content includes other-content link information for accessing a resource contained in another content, the other-content link information describing information referring to the startup document of the another content;
      at least one of the resources contained in the content includes self-content link information for accessing a resource contained in the content, the self-content link describing information referring to the resource for which the self-content link information is for accessing; and
      each respective sub-license of the sub-licenses includes (i) sub-license identification information that is unique information identifying the respective sub-license, (ii) the license identification information that is unique information identifying the corresponding view license, (iii) a usage rule that represents a condition regarding a view period and a condition regarding a view limitation when the respective sub-license is used, and (iv) a key bunch of decryption keys for decoding the content when encrypted,
   wherein the receiving terminal comprises:
      a first request section that (i) when a user has given an instruction to switch a view target based on the other-content link information included in the at least one of the resources, transmits, to the server, the information referring to the startup document of the another content described in the other-content link information so as to request the startup document of the another content, and (ii) when the user has given an instruction to switch a view target based on the self-content link information included in the at least one of the resources, transmits, to the server, the information referring to the resource for which the self-content link information is for accessing and described in the self-content link information so as to request the resource for which the self-content link information is for accessing;
      a view license setting section that (a) when the startup document of the another content has been received from the server, stores, in the receiving terminal, the resource-corresponding information included in the received startup document, selects a piece of license information from the plurality of pieces of license information included in the received startup document, acquires the view license corresponding to the license identification information described in the selected piece of license information, and stores the acquired view license in the receiving terminal, and (b) when the selected piece of license information includes the resource identification information of the corresponding sub-license, further acquires, from the server, the corresponding sub-license identified by the resource identification information of the selected piece of license information and stores the acquired sub-license in the receiving terminal;

a second request section that, after the view license setting section performs (a) and (b), extracts the reference destination information of the upper-level resource described in the received startup document and transmits the extracted reference destination information to the server so as to request the upper-level resource; and a presentation section that (1)(a) when the resource for which the self-content link information is for accessing has been received from the server and when the content does not correspond to any sub-license of the sub-licenses, decrypts the encrypted resource for which the self-content link information is for accessing using the decryption key uniquely specified based on the resource-corresponding information stored in advance in the receiving terminal and presents the encrypted resource, (1)(b) when the resource for which the self-content link information is for accessing has been received from the server and when the content corresponds to a sub-license of the sub-licenses, decrypts the encrypted sub-license corresponding to the content using the decryption key, decrypts an encrypted resource of the plurality of resources using at least one of the decryption keys included in the decrypted sub-license, and presents the decrypted resource, (2)(a) when the upper-level resource has been received from the server and when the content does not correspond to any sub-license of the sub-licenses, decrypts the encrypted upper-level resource using the decryption key uniquely specified based on the resource-corresponding information newly stored in the receiving terminal by the view license setting section and presents the decrypted upper-level resource, and (2)(b) when the upper-level resource has been received by the server and when the content corresponds to a sub-license of the sub-licenses, decrypts the encrypted sub-license corresponding to the content using the decryption key, decrypts the encrypted upper-level resource using at least one of the decryption keys included in the decrypted sub-license, and presents the decrypted upper-level resource, and wherein the server comprises:

a first transmission section that (i) when a request for the startup document has been received from the first request section of the receiving terminal, transmits, to the receiving terminal, the startup document referred to by the information transmitted from the first request section and referring to the startup document, and (ii) when a request for the resource for which the self-content link information is for accessing has been received, transmits, to the receiving terminal, the resource for which the self-content link information is for accessing and referred to by the information transmitted from the first request section and referring to the resource for which the self-content link information is for accessing; and a second transmission section that, when a request for the upper-level resource has been received from the second request section of the receiving terminal, transmits, to the receiving terminal, the upper-level resource referred to by the extracted reference destination information transmitted from the second request section.

2. A server and content, stored by the server, to be distributed to a receiving terminal, the content containing a plurality of resources, wherein the content includes:

an upper-level resource that is first referred to by a startup document, the upper-level resource being from among the plurality of resources contained in the content, such that the upper-level resource is the first of the plurality of resources referred to by the startup document;

at least one lower-level resource to be referred to from the upper-level resource; and the startup document including (i) reference destination information of the upper-level resource, (ii) content identification information identifying the content, (iii) a plurality of pieces of license information about view licenses for making the content usable, (iv) resource-corresponding information causing the plurality of resources contained in the content to correspond to one or more decryption keys included in the view licenses and required for decryption, and (v) sub-licenses when the content corresponds to the sub-licenses, such that:

each of the sub-licenses manages one or more respective keys, the one or more respective keys managed by each sub-license having encrypted one of the plurality of resources;

each of the sub-licenses has data obtained by encrypting the one or more respective keys by a common key;

the content corresponds to the content identification information identifying the content;

each of the plurality of pieces of license information includes (i) license identification information that is unique information identifying a corresponding view license of the view licenses, and (ii) when the corresponding view license makes a corresponding sub-license of the sub-licenses usable, resource identification information of the corresponding sub-license;

each of the view licenses is stored in the server and each respective view license of the view licenses includes (i) the license identification information that is unique information identifying the respective view license, (ii) a usage rule representing a condition regarding a view period and a condition regarding a view limitation, and (iii) a key bunch of decryption keys for decoding one of the content, when encrypted, and the corresponding sub-license, when encrypted;

the resource-corresponding information includes, for each of the plurality of the pieces of license information, a name of the resource identification information of the corresponding sub-license and identification information of a corresponding decryption key of the decryption keys included in the view licenses;

at least one of the resources contained in the content includes other-content link information for accessing a resource contained in another content, the other-content link information describing information referring to the startup document of the another content;

at least one of the resources contained in the content includes self-content link information for accessing a resource contained in the content, the self-content link describing information referring to the resource for which the self-content link information is for accessing; and each respective sub-license of the sub-licenses includes (i) sub-license identification information that is unique information identifying the respective sub-license, (ii) the license identification information that is unique information identifying the corresponding view license, (iii) a usage rule that represents a condition regarding a view period and a condition regarding a view limitation when the respective sub-license is used, and (iv) a key bunch of decryption keys for decoding the content when encrypted, and wherein the server comprises:

a storage section storing the content to be distributed to the receiving terminal;

a first transmission section that (i) when a request for the startup document has been received from the receiving terminal, transmits, to the receiving terminal, the startup document referred to by the information referring to the startup document, and (ii) when a request for the resource for which the self-content link information is for accessing has been received, transmits, to the receiving terminal, the resource for which the self-content link information is for accessing; and a second transmission section that, when a request for the upper-level resource has been received from the receiving terminal, transmits, to the receiving terminal, the upper-level resource referred to by the reference destination information included in the request for the upper-level resource.

3. A receiving terminal and content, received by the receiving terminal, distributed from a server that stores the content, the content containing a plurality of resources, wherein the content includes:

an upper-level resource that is first referred to by a startup document, the upper-level resource being from among the plurality of resources contained in the content, such that the upper-level resource is the first of the plurality of resources referred to by the startup document;

at least one lower-level resource to be referred to from the upper-level resource; and the startup document including (i) reference destination information of the upper-level resource, (ii) content identification information identifying the content, (iii) a plurality of pieces of license information about view licenses for making the content usable, (iv) resource-corresponding information causing the plurality of resources contained in the content to correspond to one or more decryption keys included in the view licenses and required for decryption, and (v) sub-licenses when the content corresponds to the sub-licenses, such that:

each of the sub-licenses manages one or more respective keys, the one or more respective keys managed by each sub-license having encrypted one of the plurality of resources; and each of the sub-licenses has data obtained by encrypting the one or more respective keys by a common key;

the content corresponds to the content identification information identifying the content;

each of the plurality of pieces of license information includes (i) license identification information that is unique information identifying a corresponding view license of the view licenses, and (ii) when the corresponding view license makes a corresponding sub-license of the sub-licenses usable, resource identification information of the corresponding sub-license;

each of the view licenses is stored in the server and each respective view license of the view licenses includes (i) the license identification information that is unique information identifying the respective view license, (ii) a usage rule representing a condition regarding a view period and a condition regarding a view limitation, and (iii) a key bunch of decryption keys for decoding one of the content, when encrypted, and the corresponding sub-license, when encrypted;

the resource-corresponding information includes, for each of the plurality of the pieces of license information, a name of the resource identification information of the corresponding sub-license and identification information of a corresponding decryption key of the decryption keys included in the view licenses;

at least one of the resources contained in the content includes other-content link information for accessing a resource contained in another content, the other-content link information describing information referring to the startup document of the another content;

at least one of the resources contained in the content includes self-content link information for accessing a resource contained in the content, the self-content link describing information referring to the resource for which the self-content link information is for accessing; and each respective sub-license of the sub-licenses includes (i) sub-license identification information that is unique information identifying the respective sub-license, (ii) the license identification information that is unique information identifying the corresponding view license, (iii) a usage rule that represents a condition regarding a view period and a condition regarding a view limitation when the respective sub-license is used, and (iv) a key bunch of decryption keys for decoding the content when encrypted, and wherein the receiving terminal comprises:

a first request section that (i) when a user has given an instruction to switch a view target based on the other-content link information included in the at least one of the resources, transmits, to the server, the information referring to the startup document of the another content described in the other-content link information so as to request the startup document of the another content, and (ii) when the user has given an instruction to switch a view target based on the self-content link information included in the at least one of the resources, transmits, to the server, the information referring to the resource for which the self-content link information is for accessing and described in the self-content link information so as to request the resource for which the self-content link information is for accessing;

a view license setting section that (a) when the startup document of the another content has been received from the server, stores, in the receiving terminal, the resource-corresponding information included in the received startup document, selects a piece of license information from the plurality of pieces of license information included in the received startup document, acquires the view license corresponding to the license identification information described in the selected piece of license information, and stores the acquired view license in the receiving terminal, and (b) when the selected piece of license information includes the resource identification information of the corresponding sub-license, further acquires, from the server, the corresponding sub-license identified by the resource identification information of the selected piece of license information and stores the acquired sub-license in the receiving terminal;

a second request section that, after the view license setting section performs (a) and (b), extracts the reference destination information of the upper-level resource described in the received startup document and transmits the extracted reference destination information to the server so as to request the upper-level resource; and a presentation section that (1)(a) when the resource for which the self-content link information is for accessing has been received from the server and when the content does not correspond to any sub-license of the sub-licenses, decrypts the encrypted resource for which the self-content link information is for accessing using the decryption key uniquely specified based on the resource-corresponding information stored in advance in the receiving terminal and presents the encrypted resource, (1)(b) when the resource for which the self-content link information is for accessing has been received from the server and when the content corresponds to a sub-license of the sub-licenses, decrypts the encrypted sub-license corresponding to the content using the decryption key, decrypts an encrypted resource of the plurality of resources using at least one of the decryption keys included in the decrypted sub-license, and presents the decrypted resource, (2)(a) when the upper-level resource has been received from the server and when the content does not correspond to any sub-license of the sub-licenses, decrypts the encrypted upper-level resource using the decryption key uniquely specified based on the resource-corresponding information newly stored in the receiving terminal by the view license setting section and presents the decrypted upper-level resource, and (2)(b) when the upper-level resource has been received from the server and when the content corresponds to a sub-license of the sub-licenses, decrypts the encrypted sub-license corresponding to the content using the decryption key, decrypts the encrypted upper-level resource using at least one of the decryption keys included in the decrypted sub-license, and presents the decrypted upper-level resource.

4. A content and a non-transitory computer-readable recording medium having a server program recorded thereon, the server program to be executed by a server that stores the content to be distributed to a receiving terminal, the content containing a plurality of resources, wherein the content includes:

an upper-level resource that is first referred to by a startup document, the upper-level resource being from among the plurality of resources contained in the content, such that the upper-level resource is the first of the plurality of resources referred to by the startup document;

at least one lower-level resource to be referred to from the upper-level resource; and the startup document including (i) reference destination information of the upper-level resource, (ii) content identification information identifying the content, (iii) a plurality of pieces of license information about view licenses for making the content usable, (iv) resource-corresponding information causing the plurality of resources contained in the content to correspond to one or more decryption keys included in the view licenses and required for decryption, and (v) sub-licenses when the content corresponds to the sub-licenses, such that:

each of the sub-licenses manages one or more respective keys, the one or more respective keys managed by each sub-license having encrypted one of the plurality of resources;

each of the sub-licenses has data obtained by encrypting the one or more respective keys by a common key;

the content corresponds to the content identification information identifying the content;

each of the plurality of pieces of license information includes (i) license identification information that is unique information identifying a corresponding view license of the view licenses, and (ii) when the corresponding view license makes a corresponding sub-license of the sub-licenses usable, resource identification information of the corresponding sub-license;

each of the view licenses is stored in the server and each respective view license of the view licenses includes (i) the license identification information that is unique information identifying the respective view license, (ii) a usage rule representing a condition regarding a view period and a condition regarding a view limitation, and (iii) a key bunch of decryption keys for decoding one of the content, when encrypted, and the corresponding sub-license, when encrypted;

the resource-corresponding information includes, for each of the plurality of the pieces of license information, a name of the resource identification information of the corresponding sub-license and identification information of a corresponding decryption key of the decryption keys included in the view licenses;

at least one of the resources contained in the content includes other-content link information for accessing a resource contained in another content, the other-content link information describing information referring to the startup document of the another content;

at least one of the resources contained in the content includes self-content link information for accessing a resource contained in the content, the self-content link describing information referring to the resource for which the self-content link information is for accessing; and each respective sub-license of the sub-licenses includes (i) sub-license identification information that is unique information identifying the respective sub-license, (ii) the license identification information that is unique information identifying the corresponding view license, (iii) a usage rule that represents a condition regarding a view period and a condition regarding a view limitation when the respective sub-license is used, and (iv) a key bunch of decryption keys for decoding the content when encrypted, and wherein the server program causes the server to execute a method comprising:

a first transmission step of (i) when a request for the startup document has been received from the receiving terminal, transmitting, to the receiving terminal, the startup document referred to by the information referring to the startup document, and (ii) when a request for the resource for which the self-content link information is for accessing has been received, transmitting, to the receiving terminal, the resource for which the self-content link information is for accessing; and a second transmission step of, when a request for the upper-level resource has been received from the receiving terminal, transmitting, to the receiving terminal, the upper-level resource referred to by the reference destination information included in the request for the upper-level resource.

5. A content and a non-transitory computer-readable recording medium having a receiving terminal program recorded thereon, the receiving terminal program to be executed by a receiving terminal that receives the content distributed from a server that stores the content, the content containing a plurality of resources, wherein the content includes:

an upper-level resource that is first referred to by a startup document, the upper-level resource being from among the plurality of resources contained in the content, such that the upper-level resource is the first of the plurality of resources referred to by the startup document;

at least one lower-level resource to be referred to from the upper-level resource; and the startup document including (i) reference destination information of the upper-level resource, (ii) content identification information identifying the content, (iii) a plurality of pieces of license information about view licenses for making the content usable, (iv) resource-corresponding information causing the plurality of resources contained in the content to correspond to one or more decryption keys included in the view licenses and required for decryption, and (v) sub-licenses when the content corresponds to the sub-licenses, such that:

each of the sub-licenses manages one or more respective keys, the one or more respective keys managed by each sub-license having encrypted one of the plurality of resources;

each of the sub-licenses has data obtained by encrypting the one or more respective keys by a common key;

the content corresponds to the content identification information identifying the content;

each of the plurality of pieces of license information includes (i) license identification information that is unique information identifying a corresponding view license of the view licenses, and (ii) when the corresponding view license makes a corresponding sub-license of the sub-licenses usable, resource identification information of the corresponding sub-license;

each of the view licenses is stored in the server and each respective view license of the view licenses includes (i) the license identification information that is unique information identifying the respective view license, (ii) a usage rule representing a condition regarding a view period and a condition regarding a view limitation, and (iii) a key bunch of decryption keys for decoding one of the content, when encrypted, and the corresponding sub-license, when encrypted;

the resource-corresponding information includes, for each of the plurality of the pieces of license information, a name of the resource identification information of the corresponding sub-license and identification information of a corresponding decryption key of the decryption keys included in the view licenses;

at least one of the resources contained in the content includes other-content link information for accessing a resource contained in another content, the other-content link information describing information referring to the startup document of the another content;

at least one of the resources contained in the content includes self-content link information for accessing a resource contained in the content, the self-content link describing information referring to the resource for which the self-content link information is for accessing; and each respective sub-license of the sub-licenses includes (i) sub-license identification information that is unique information identifying the respective sub-license, (ii) the license identification information that is unique information identifying the corresponding view license, (iii) a usage rule that represents a condition regarding a view period and a condition regarding a view limitation when the respective sub-license is used, and (iv) a key bunch of decryption keys for decoding the content when encrypted, and wherein the receiving terminal program causes the receiving terminal to execute a method comprising:

a first request step of (i) when a user has given an instruction to switch a view target based on the other-content link information included in the at least one of the resources, transmitting, to the server, the information referring to the startup document of the another content described in the other-content link information so as to request the startup document of the another content, and (ii) when the user has given an instruction to switch a view target based on the self-content link information included in the at least one of the resources, transmitting, to the server, the information referring to the resource for which the self-content link information is for accessing and described in the self-content link information so as to request the resource for which the self-content link information is for accessing;

a view license setting step of (a) when the startup document of the another content has been received from the server, storing, in the receiving terminal, the resource-corresponding information included in the received startup document, selecting a piece of license information from the plurality of pieces of license information included in the received startup document, acquiring the view license corresponding to the license identification information described in the selected piece of license information, and storing the acquired view license in the receiving terminal, and (b) when the selected piece of license information includes the resource identification information of the corresponding sub-license, further acquiring, from the server, the corresponding sub-license identified by the resource identification information of the selected piece of license information and storing the acquired sub-license in the receiving terminal;

a second request step of, after the view license setting step performs (a) and (b), extracting the reference destination information of the upper-level resource described in the received startup document and transmitting the extracted reference destination information to the server so as to request the upper-level resource; and a presentation step of (1)(a) when the resource for which the self-content link information is for accessing has been received from the server and when the content does not correspond to any sub-license of the sub-licenses, decrypting the encrypted resource for which the self-content link information is for accessing using the decryption key uniquely specified based on the resource-corresponding information stored in advance in the receiving terminal and presenting the encrypted resource, (1)(b) when the resource for which the self-content link information is for accessing has been received from the server and when the content corresponds to a sub-license of the sub-licenses, decrypting the encrypted sub-license corresponding to the content using the decryption key, decrypting an encrypted resource of the plurality of resources using at least one of the decryption keys included in the decrypted sub-license, and presenting the decrypted resource, (2)(a) when the upper-level resource has been received from the server and when the content does not correspond to any sub-license of the sub-licenses, decrypting the encrypted upper-level resource using the decryption key uniquely specified based on the resource-corresponding information newly stored in the receiving terminal by the view license setting section and presenting the decrypted upper-level resource, and (2)(b) when the upper-level resource has been received from the server and when the content corresponds to a sub-license of the sub-licenses, decrypting the encrypted sub-license corresponding to the content using the decryption key, decrypting the encrypted upper-level resource using at least one of the decryption keys included in the decrypted sub-license, and presenting the decrypted upper-level resource.

* * * * *

UNITED STATES PATENT AND TRADEMARK OFFICE
CERTIFICATE OF CORRECTION

PATENT NO. : 7,885,894 B2  
APPLICATION NO. : 10/566836  
DATED : February 8, 2011  
INVENTOR(S) : Tatsuya Shimoji et al.

Page 1 of 1

It is certified that error appears in the above-identified patent and that said Letters Patent is hereby corrected as shown below:

On the Title Page

In Section (73) Assignee, please change "Panasonic Corporation, Osaka (JP)" to

--Panasonic Corporation, Osaka (JP), and Sony Corporation, Tokyo (JP)--.

Signed and Sealed this  
Twenty-eighth Day of June, 2011

David J. Kappos  
*Director of the United States Patent and Trademark Office*